United States Patent
Hofman

(10) Patent No.: US 10,970,381 B2
(45) Date of Patent: *Apr. 6, 2021

(54) SYSTEM FOR IDENTIFYING UNAUTHORIZED SIGNALS ON A DATA BUS

(71) Applicant: Sital Technology And Hardware Engineering (1997) Ltd., Kfar-Saba (IL)

(72) Inventor: Ofer Hofman, Timrat (IL)

(73) Assignee: Sital Technology And Hardware Engineering (1997) Ltd., Kfar-Saba (IL)

( * ) Notice: Subject to any disclaimer, the term of this patent is extended or adjusted under 35 U.S.C. 154(b) by 89 days.

This patent is subject to a terminal disclaimer.

(21) Appl. No.: 15/579,234

(22) PCT Filed: Jun. 13, 2016

(86) PCT No.: PCT/IL2016/050618
§ 371 (c)(1),
(2) Date: Dec. 4, 2017

(87) PCT Pub. No.: WO2017/017668
PCT Pub. Date: Feb. 2, 2017

(65) Prior Publication Data
US 2018/0181743 A1    Jun. 28, 2018

Related U.S. Application Data

(60) Provisional application No. 62/190,771, filed on Jul. 10, 2015.

(51) Int. Cl.
*G06F 7/04*     (2006.01)
*G06F 12/00*    (2006.01)
(Continued)

(52) U.S. Cl.
CPC ............. *G06F 21/44* (2013.01); *G06F 13/36* (2013.01); *G06F 21/55* (2013.01); *G06F 21/85* (2013.01);
(Continued)

(58) Field of Classification Search
USPC .......................................................... 726/18
See application file for complete search history.

(56) References Cited

U.S. PATENT DOCUMENTS 6,650,258 B1 *  11/2003  Kelly ................. H03H 17/0671
                                                    341/61
7,812,617 B2    10/2010  Hofman
(Continued)

FOREIGN PATENT DOCUMENTS

WO      2004013964 A2    2/2004

OTHER PUBLICATIONS

International Search Report in PCT/IL2016/50618 dated Nov. 28, 2016.

*Primary Examiner* — Wasika Nipa
*Assistant Examiner* — Samuel Ambaye
(74) *Attorney, Agent, or Firm* — Manelli Selter PLLC; Edward Stemberger

(57) ABSTRACT

Communication bus enables devices to communicate and exchange information and control signals. There is a growing concern over the security of such types of buses. Since any device can transmit any message, and device on the bus which can be compromised poses a threat for the bus. Described is a system to authenticate the source of messages from various devices on a communication bus.

9 Claims, 3 Drawing Sheets

(51) Int. Cl.
*G06F 12/14* (2006.01)
*G06F 13/00* (2006.01)
*G11C 7/00* (2006.01)
*G06F 21/44* (2013.01)
*G06F 21/55* (2013.01)
*G06F 21/85* (2013.01)
*H04L 12/40* (2006.01)
*H04L 29/06* (2006.01)
*G06F 13/36* (2006.01)

(52) U.S. Cl.
CPC .......... *H04L 12/40* (2013.01); *H04L 63/1408* (2013.01); *G06F 2221/034* (2013.01); *H04L 63/1441* (2013.01); *H04L 2012/40215* (2013.01)

(56) References Cited

U.S. PATENT DOCUMENTS

| | | | |
|---|---|---|---|
| 8,955,130 | B1 | 2/2015 | Kalintsev et al. |
| 2004/0158781 | A1 | 8/2004 | Pihet |
| 2008/0043629 | A1* | 2/2008 | Hofman ............... H04L 41/0677 370/242 |
| 2008/0084716 | A1* | 4/2008 | Ganev .................... H02M 1/14 363/39 |
| 2008/0186870 | A1* | 8/2008 | Butts .................... H04L 43/0847 370/252 |
| 2011/0191833 | A1 | 8/2011 | Yi et al. |
| 2011/0225651 | A1 | 9/2011 | Villasenor et al. |
| 2013/0117613 | A1* | 5/2013 | Tai ...................... G11C 11/5642 714/54 |
| 2013/0197920 | A1* | 8/2013 | Lesso ................. H04L 25/4902 704/500 |
| 2016/0306967 | A1* | 10/2016 | Hart ........................ G06F 21/56 |

* cited by examiner

US 10,970,381 B2

SYSTEM FOR IDENTIFYING UNAUTHORIZED SIGNALS ON A DATA BUS

TECHNOLOGY FIELD

The present device and method relate to the field of authentication of devices connected to a communication bus.

BACKGROUND

There are several architectures for transmitting information from one electronic device to another. A commonly used architecture is shown in FIG. 1A. In this architecture the devices share a common communication structure, often called a data bus or communication bus. In this architecture, each device connected to the data bus can transmit information on the data bus, or receive any information transmitted on the data bus. In addition the information transmitted on the data bus can pass undistorted through each of the devices. Examples of such buses are RS485/422, CAN BUS, Flex Ray and others.

A large number of devices can be connected to data buses described above. In some data buses the devices are identified by a unique identification (ID) number. In such cases the ID number will appear in every communication from the device and can be used to authenticate the source of the communication. On other data buses such as for example the CAN BUS, the messages are identified by a message ID number and the messages are not associated to a specific device. Hence any device can transit any message on the bus without any limitation.

There is a growing concern over the security of such types of buses. Since any device can transmit any message, and device on the bus which can be compromised poses a threat for the bus. As a specific example, we can consider the CAN BUS of a car. A device with a Bluetooth wireless connection such as the car radio can be hacked and a perpetrator can gain control of the car radio. The perpetrator can then use the car radio which is connected to the car's CAN BUS to issue any message and even initiate some actions. Examples of messages include; to unlock the car, or press on the brake pedal; or change the car speedometer or revolution reading. The common thread is that the car's integrity and driver safety can be seriously compromised by a perpetrator which can access any device connected to the car's CAN BUS.

GLOSSARY

"Data bus" as used in the current disclosure means one or more wires connecting two or more electronic devices and used to transmit electronic data information from one device to another.

"Data bus line" as used in the current disclosure means a wire used in a data bus.

"Voltage level" as used in the current disclosure means a predefined voltage of the data bus line.

"Data bus signal" as used in the current disclosure means the difference between the voltage levels on the two data bus lines of a differential data bus.

"Physical traits" as used in the current disclosure means the physical features of the data bus signal, example of physical traits include; signal pulse width; signal tail; signal voltage; signal inter pulse timing jitter; signal pulse slew rate; and signal inter pulse or in pulse voltage variations.

"Passive Time Domain Reflectometry" (PTDR) as used in the current disclosure is an electronic device which is electrically connected to the data bus and measures the physical traits of the data bus signals.

DESCRIPTION

U.S. Pat. No. 7,812,617 and U.S. Ser. No. 14/559,966 filed Dec. 4, 2014 with priority date of Dec. 30, 2013 to the same assignee, describe a system to identify faults in a CAN BUS. The faults are identified in real time using an approach termed passive time domain reflectometry (PTDR). In these references, a receiving device measures certain signal characteristics such as signal tail or signal pulse width and provides an alert when the signal physical trait is indicative of a fault condition. Reference "Passive Time Domain Reflectometry Based Authentication for Controller Area Network Bus", has described using the PTDR approach to identify the device transmitting a signal on the bus. However the method described in "Passive Time Domain Reflectometry Based Authentication for Controller Area Network Bus" has several shortcomings; the signals are not repeatable from car to car; the signals are actually not indicative of the devices but of the bus medium and associated faults. Due to these the "Passive Time Domain Reflectometry Based Authentication for Controller Area Network Bus" system has a significant number of false alarms which are detrimental to a secure operation of the system.

Figure 1A:
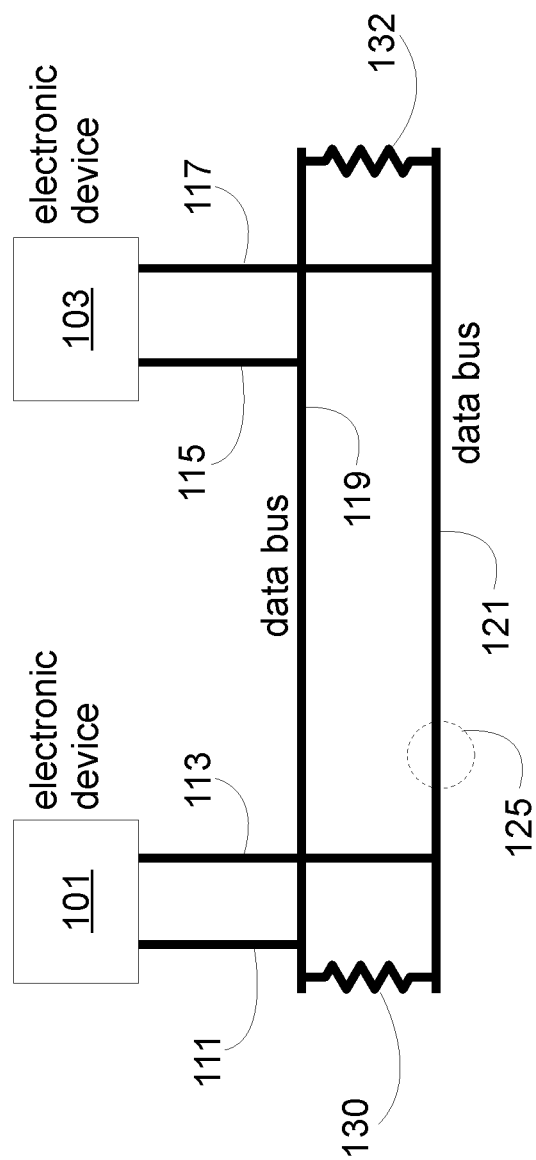
FIG. 1A is an example of a data bus connecting electronic devices.

FIG. 1A is an example of a data bus (119, 121) providing a means to connect electronic devices (101, 103) to each other. FIG. 1A is an example of a data bus, where device 101 is connected to the data bus (119, 121) via lines 111, 113 and device 103 is connected to the data bus (119, 121) via lines 115, and 117. The devices (101, 103) transmit data by applying a voltage on the data bus (119,121). In one example, in a differential data bus, the initial line voltage level of data bus line 119 is equal to the initial voltage level of data bus line 121. When the devices (101, 103) transmit data they generate a time varying line voltage signal comprised of a set of voltage levels. A bit is the minimal data information unit. It can have two values a '1' or a '0'. Each bit is defined by a set of two voltages levels which are applied by the device (101, 103) on the data bus (119, 121) for the duration of time corresponding to the bit duration. Termination resistors (130, 132) provide a matched impedance at the termination point of the bus and prevent signal reflections from the termination point of the bus.

Figure 1B:
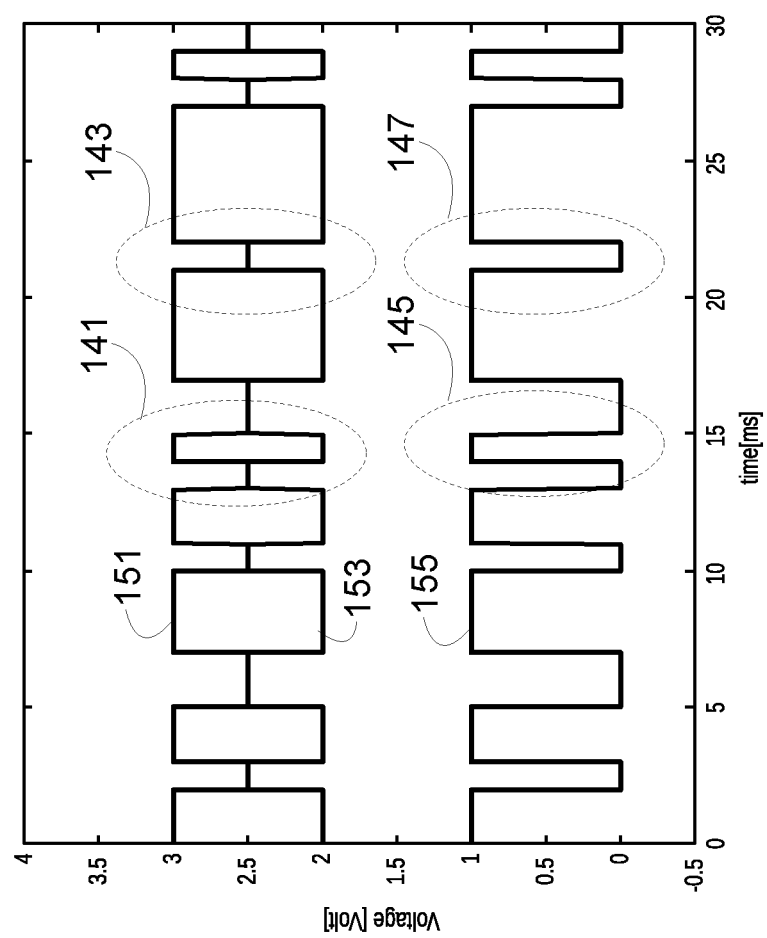
FIG. 1B is an example of the received signals on the data bus.

FIG. 1B is an example of the line voltage signals (151, 153) on the data bus (119, 121). The resulting data bus signal (155) is the voltage difference between the line voltage signals (151, 153). Line 151 is the line voltage signal on one data bus line (119), and line 153 is the line voltage signal on the second data bus line (121). Line 151 comprises two voltage levels. An example of a voltage level is a high voltage level of 3V, and a low voltage level of 2.5V. Examples of other voltage level are described in relevant communication standards such as CAN BUS Spec 2.0, ISO 11898-2. In CAN BUS Spec, the CAN high voltage on a bus line wire (119) is 3.5V and the CAN low voltage on a bus line wire (121) is 1.5V. The signals are named dominant and recessive. Dominant signal, also named '0', is when the voltage difference between the bus line wires (119, 121) is higher than 2V. Recessive signal, also named '1', is when the voltage difference is 0V (zero) and both wires are floating on a common voltage of 2.5V. Line 153 comprises of two voltage levels. In one example, the high voltage level of line 153 is equal to the low voltage level of line 151. In another example, the high voltage level of data bus line 153 is lower than the low voltage level of data bus line 151. In one example, the high voltage level of data bus line 153 is lower by more than 0.5V over the low voltage level of data bus line 151.

The data bus signal described in FIG. 1B is comprised of multiple bits. In one example a '1' bit is shown in ellipse 145. In one example a '1' data bus signal is obtained when the voltage level in line voltage 151 is high and when the voltage level in line voltage 153 is low as shown in ellipse 141. In another example a '0' data bus signal is shown in ellipse 147. In one example a '0' data bus signal is obtained when the voltage level in line voltage 151 is low and when the voltage level in line voltage 153 is high as shown in ellipse 143.

Figure 2:
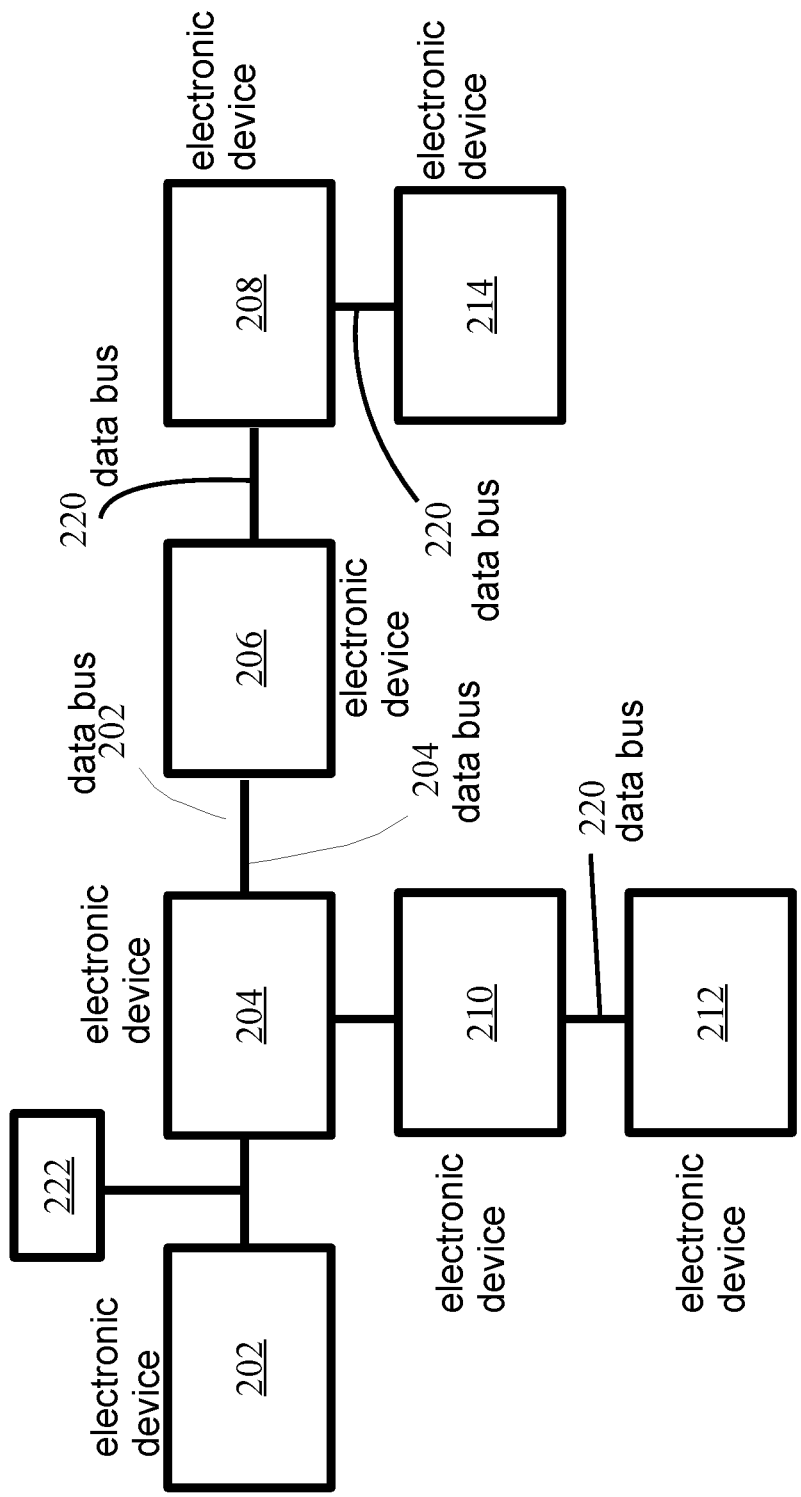
FIG. 2 is an example of a data bus connecting electronic devices and a PTDR device connected to the data bus.

FIG. 2 is an example of a data bus (220) connecting electronic devices (202, 204, 208, 210, 212, 214) and a PTDR device (222) connected to the data bus (220). The PTDR is electrically connected to the data bus (222) in the same form as any of the electronic devices (202, 204, 208, 210, 212, 214). Following is a description of a system to authenticate devices on a communication bus which is based on the PTDR.

In one example the PTDR (222) comprises of;

a receiver, designed to receive the electronic signals on the bus;

a fast counter designed to provide a reference time base for analyzing said signals;

a logic unit configure to analyze said signals using said reference time base;

a communication device which can either be a transmitter for the bus or a wireless transceiver.

In an additional example, the PTDR can comprise of any of the following in addition to the items presented above;

A data recording unit;

A data base of devices and associated signal characteristics, said data base contained in a non-volatile memory.

A signal removal unit which can be activated to remove unauthorized signals from the data bus.

In one example PTDR (222) is operated continuously and measures the physical traits of the data bus signals. Examples of physical traits include; signal pulse width; signal voltage; signal inter pulse timing jitter; transmitter oscillator frequency; signal pulse slew rate; and signal inter pulse or in pulse voltage variations. Specifically we discuss some traits their advantages and potential use.

Signal Voltage—Each different device on the bus has a different electrical circuit or components and is located in a different place on the bus. The location and structure of the device produce a variety of signal voltages on the busses. In one example of use, the voltage for each transmitter is measured. In one example the voltage can be measured during a specific timing in the data transmission as described below. It should be noted that the analog to digital sample point should be a very specific point in the message as bit widths might be very short. For example in the CAN FD standard the bit may be as short as 100 ns. The signal voltage is vulnerable to wire disconnections, and should not be used during a failure in the bus.

Signal pulse width—In a CAN BUS, valid dominant pulse widths are legal from 1 to 5 bits long. Two transmitters might have almost the same single bit width but a different 5-bit width measurement. The signal pulse widths is vulnerable to wire disconnections, and should not be used during a failure in the bus.

Signal pulse slew rate or signal rise time and fall time— The rise time and fall time changes from transmitter to transmitter. In one example the slew rate can be measured using the fast counter. One method to measure the slew rate is; adding an additional transceiver with attenuated input signal, such as attenuate by ½, using the fast counter, measure the time from the level of one receiver to second receiver to determine rise time, and from second receiver to first receiver to measure fall time. The slew rate is vulnerable to wire disconnections, and should not be used during a failure in the bus.

Transmitter oscillator frequency—each transmitter on the bus has its own oscillator. Each standard, for example, such as CAN BUS define the parts per million (PPM) at which these oscillator frequencies can vary. Once assembled in a specific system, a qualified oscillator would generate a frequency that is as close to the designated frequency up to the oscillator device PPM tolerance. The actual frequency of each transmitter is distinctive and can serve as a physical trait. In order to measure this trait a fast counter can measure between two edges of dominant bits that are 50 microseconds apart. For an oscillator with 100 PPM (=0.01%), 50 microseconds would yield differences of 5 nanoseconds plus or minus. This measurement is indifferent to bus fault.

The PTDR (222) data base includes a list of message numbers and their allowed transmitters' identification number. The data base can further include a transmitter identification number and a list of physical traits of the signal. The traits can include absolute numbers or ranges of number for each physical trait. For example the data base can include values of voltages, voltage ranges, pulse width etc. In one example the data base includes the mean and variance of a physical trait. The logic unit can use these numbers to calculate the probability that a received signal was transmitted from a specific transmitter.

The fast counter is one of the components facilitating operation of the PTDR. The fast counter provides a time base for all the temporal features of the received signal. In one example the fast counter is implemented by a set of slower counters. For example if a particular electronic IC can accommodate a standard binary counter up to a particular frequency—Fmax. The fast counter can be implemented in the same IC design rules, but achieve counting frequencies that are higher than Fmax. As an example described is a 8×Fmax counter.

A phase locked loop (PLL) or digital phase locked loop (DLL) generates four clock signals at frequencies up to Fmax and at 50% duty cycle. Each clock is shifted by 45°, hence each clock has a rising edge at: 0°, 45°, 90°, 135° respectively. The falling edges are at 180°, 225°, 270°, 315°. The clock signal drives eight counters. Each counter is configured to count at the respective rising or falling edge of the counter signal. All eight counters are summed to yield a counter 8 times higher than the frequency of original clock. The key to the successful operation of such a fast counter is that each counter, using it's unique clock edge, is buffered by a flip flop that samples the input enable signal. This flip flop serves as a clock domain crossing barrier for each individual slower counter, clocked by the unique clock of that counter.

Typical data buses contain tens of devices which are constantly transmitting information on the data bus. The PTDR continuously analyzes the signals on the data bus and extracts the physical traits of the signals. It is desired to reduce the error in physical trait extraction. It was observed that by sampling at specific times and in specific manner the cross talk associated with other signals can be reduced and the physical trait can be extracted with a smaller uncertainty in the acquired value. There are three parts in a CAN BUS message that can be used to measure the physical traits of the source transmitter characteristics. The arbitration part at the beginning, the acknowledge part at the end, and the data bearing part between the arbitration and acknowledge parts. In the arbitration and acknowledge parts, a few or even all the modules transmit on the bus at the same time, hence it is hard to identify a single transmitter. The data part of the message is transmitted only by a single transmitter, and thus, this is the appropriate time to authenticate the transmitter which is the source of the message and derive the relevant traits.

An example of PTDR operation is:

a change in voltage on the data bus activates the fast counter;

the voltage on the data bus is sampled at a rate which is at least ten times higher than the data bus signal rate;

the voltage and timing information is processed by the logic unit to extract the pertinent physical traits of the signal;

the message identification number is analyzed using the data bus protocol;

the logic unit retrieves the authorized transmitters for the message identification number;

for every authorized transmitter;

the logic unit compares the measured physical traits to the physical traits data contained in the data base; and in case there is no match the logic unit outputs that the received message is not from an authorized transmitter;

One critical aspect of operation of this system is the reduction of false alarms. A false alarm occurs when due to noise on the data bus the measured physical traits do not correspond to an authorized transmitter. In this case the logic unit can indicate erroneously that the received message is not from an authorized transmitter. To reduce the percentage of false alarms the following actions are performed;

The physical traits are stored as descriptive statistical data and the logic unit computes the probability that the physical trait measured correspond to the descriptive statistical data. For example if the distribution of values is a Gaussian random variable, than the descriptive statistical data is the mean and variance of the signal. The probability of a measured physical trait can be obtained by calculating the expectancy of the measured signal and the Gaussian generating function.

The decision of the logic unit is based on the probability of two or more physical traits. As an example, the logic unit identifies that a received message is not from an authorized transmitter if the following are met;

the probability that the voltage value is with bounds greater than 90%; and the probability that the timing jitter is within bounds greater than 95%; and the probability of the pulse width is within bounds greater than 90%.

In another example, to further minimize false alarm percentage, the process of identification described above, is refined so that the logic unit identifies that a received message is not from an authorized source only after two or more instances where the message physical traits do not fit the probability of an authorized transmitter. To support this function, the database are expanded to include a counter. In one example the counter can be added to the database of messages. When the logic unit identifies that a message is not from an authorized receiver the counter is increased by one. Only after a defined number of unauthorized messages of a certain type have been received, then the logic unit will determine that further such messages are not from an authorized if they do not meet the probability criteria of the physical traits.

In another example, the data base can be expanded to include a database of all the transmitters on the bus. Any message which is received is analyzed to find the transmitter from which it was sent. In this example, unauthorized messages which are recurringly received from a specific transmitter can provide an indication that the associated electronic device has been compromised.

Hence in one example is described a system for identifying unauthorized signals on a data bus comprising of; a data bus with data transmitted at the signal rate; a receiver connected to said data bus; a fast counter; a logic unit; a sampling unit configured to sample the data bus voltage at a sampling rate higher than the signal rate on the bus and generate a received signal; a data base containing a list of authorized messages and corresponding message physical traits; wherein the logic unit computes the physical traits of the received signal and compares the physical traits those contained in the data base. In a further example the system for identifying unauthorized signals on a data bus wherein the data bus is any of RS485/422, CAN BUS, or Flex Ray. In an additional example the fast counter is implemented by summing two or more phase shifted counters. In a further example the sampling rate is at least 5 times the signal rate. In a further example the logic unit computes the probability of the measured physical traits as belonging to a set of physical traits maintained in the data base. In another example the logic unit computes a probability of measured physical traits as belonging to a the set of physical traits maintained in the data base. In a further example logic unit provides a signal indicating a non-authorized message if the computed probability is below a predefined threshold. In an additional example the logic unit provides a signal indicating a non-authorized message if the measured physical traits do not conform to the physical traits contained in the data base.

The teaching of this disclosure can be used to construct a system and method to mitigate cyber-attacks on system which utilize data bus to communicate between electronic devices. One example of a system using data bus to communicate between electronic devices is a car. A cyber-attack on a car can be aimed to either control the car operation or disrupt its normal operation. Such disruption can lead to potentially life threatening consequences. Typically a cyber-attack on a car requires an entry path which is usually a wireless communication channel. Examples of an entry path include; the car audio system which can have either WiFi or Bluetooth® wireless connection; the car Tire Pressure Measurement System (TPSM) includes a wireless transmitter in each wheel and a wireless receiver which can be an entry point located in the car; the car WiFi unit; the car manufacturer transponder (e.g. onstar, others).

Once the perpetrator has gained access to an electronic device in the car through a wireless system, the next step is using the electronic device transmitter to broadcast unauthorized messages or commands on the data bus. Examples of such messages or commands include; activating or deactivating the cruise control in the car; locking or unlocking of car; shutting off the engine even during driving; activating the brakes etc. It is clear from such examples that a cyber-attack has detrimental consequences and identification of unauthorized messages are of utmost importance.

In a further example, the logic unit can provide an alarm or signal indicating an unauthorized message has been transmitted on the bus. In one example, the logic unit can provide the alarm as a message on the data bus. This message can be received by any electronic device on the bus. In one example, if such a message is received, the electronic device will disregard the previous unauthorized message. In another example, the alarm signal can be transmitted by a wireless channel to provide an indication to the electronic devices on the bus, or to an external electronic device, that an unauthorized message has been transmitted on the bus. In one example, the car may have a predefined procedure to be activated in case of unauthorized messages. Examples of such procedures can include; notification of the car user or owner; or notification of law enforcement authorities.

A further example describes a system which can be used to cancel unauthorized messages or commands transmitted on the bus. In contrast to the previous example, this system does not need a refinement to the electronic devices on the bus. The CAN BUS standard includes a through error handling definition for active and passive error handling. Each CAN BUS unit on the bus is defined as an active or passive error unit. The error active units are expected to listen to ALL messages on the bus, and when they detect any CAN BUS violation, they transmit a 6 bit dominant pulse. If this pulse is transmitted before the end of the message, the whole message is failed, and none of the units on the bus would process or use its data. Thus the cyber-security module can act as an active error unit, and error out messages that it detected from an unauthorized source.

In a further example, each unit monitors the CAN bus for messages which only the unit can transmit. If the unit detects a transmitted signal which should have been transmitted by the unit it can cancel the message by transmitting a 6 bit dominant pulse as described previously. As one example a unit can be a collision detection system which transmits on the CAN bus a message with a specific idea and the message is a global message alerting the various other units to a potential collision. In case the collision detection unit detects on the CAN bus a message id corresponding to a collision alert which did not emanate from the collision detection unit, then the collision detection unit will transmit a 6 bit dominant pulse and cancel the message on the CAN bus.

Hence in one example this disclosure describes a system for nulling messages on a data bus comprising: a system for detecting faults in messages transmitted on the data bus; a receiver unit configured to receive a signal from said system for authenticating messages, wherein said signal is indicative of a fault with a message on the bus; a transmitter unit; wherein the transmitter unit will transmit a predefined sequence on the data bus when the receiver receives a signal indicating a fault with the message currently transmitted. In another example the system for nulling messages on a data bus as described previously wherein the system for detecting faults in messages transmitted on the bus is any of the systems for identifying unauthorized signals described previously.

In another example utilized is the PTDR capability to detect fault conditions on the bus to mitigate false alarms. When a fault occurs, even momentarily, the physical traits of all the devices will change. The PTDR can detect the occurrence of a fault by detecting a change in pulse width or in the appearance of signal tail for a number of devices. When the PTDR detects the occurrence of a fault, it halts the authentication activity for the devices which are affected by the fault.

What is claimed is:

1. A system for identifying unauthorized signals on a data bus comprising:
   the data bus;
   two or more transmitting devices connected to the data bus and transmitting data at a signal rate;
   a receiver connected to the data bus;
   a fast counter;
   a logic unit;
   a sampling unit configured to sample the data bus voltage and generate a received signal; and
   a data base containing a list of authorized messages from each transmitting device and corresponding message physical traits;
   wherein the fast counter increases the signal rate prior to being sampled by the sampling unit, and
   wherein the logic unit is constructed and arranged to compute a probability that measured physical traits of the received signal correspond with those contained in the data base to thereby identify whether the received signal is from one of an authorized said transmitting device,
   wherein the logic unit is constructed and arranged to identify that the received signal is not from an authorized transmitting device when:
   a probability that a voltage value, as a first physical trait, is within bounds greater than 90%; and
   a probability of a pulse width, as a second physical trait, is within bounds greater than 90%.

2. The system for identifying unauthorized signals on the data bus according to claim 1, wherein the data bus is any of Mil-Std-1553, CAN BUS, Flex Ray.

3. The system for identifying unauthorized signals on the data bus according to claim 1, wherein the fast counter is implemented by summing two or more phase shifted counters.

4. The system for identifying unauthorized signals on the data bus according to claim 1, wherein the sampling rate of the sampling unit is at least 5 times the signal rate.

5. The system for identifying unauthorized signals on the data bus according to claim 1, wherein the logic unit computes a probability of measured physical traits as belonging to the set of physical traits maintained in the data base.

6. The system for identifying unauthorized signals on the data bus according to claim 5, wherein the logic unit provides a signal indicating a non-authorized message if a computed probability is below a predefined threshold.

7. The system for identifying unauthorized signals on the data bus according to claim 1, wherein the logic unit provides a signal indicating a non-authorized message if measured physical traits do not conform to the physical traits contained in the data base.

8. The system for identifying unauthorized signals on the data bus according to claim 1, further comprising a signal removal unit constructed and arranged to remove an unauthorized signal from the data bus.

9. The system for identifying unauthorized signals on the data bus according to claim 1, wherein the logic unit is constructed and arranged to provide an alarm or signal indicating that an unauthorized signal message has been transmitted on the data bus.

* * * * *